US011219847B2

(12) United States Patent
Olschok et al.

(10) Patent No.: US 11,219,847 B2
(45) Date of Patent: Jan. 11, 2022

(54) DEVICE FOR TREATING FLUID

(71) Applicant: HYDAC PROCESS TECHNOLOGY GMBH, Neunkirchen (DE)

(72) Inventors: Markus Olschok, Neunkirchen (DE); Ralf Wnuk, Bexbach/Kleinottweiler (DE); Christian Schindler, Schiffweiler (DE); Maximilian Meiners, Mandelbachtal (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 0 days.

(21) Appl. No.: 16/495,149

(22) PCT Filed: Mar. 19, 2018

(86) PCT No.: PCT/EP2018/056907
§ 371 (c)(1),
(2) Date: Sep. 18, 2019

(87) PCT Pub. No.: WO2018/188905
PCT Pub. Date: Oct. 18, 2018

(65) Prior Publication Data
US 2020/0016518 A1 Jan. 16, 2020

(30) Foreign Application Priority Data
Apr. 12, 2017 (DE) ...................... 10 2017 003 577.6

(51) Int. Cl.
*B01D 29/21* (2006.01)
*B01D 36/00* (2006.01)
*B01D 29/58* (2006.01)

(52) U.S. Cl.
CPC ............. *B01D 29/21* (2013.01); *B01D 29/58* (2013.01); *B01D 36/003* (2013.01);
(Continued)

(58) Field of Classification Search
CPC ...... B01D 29/21; B01D 29/58; B01D 36/003; B01D 2201/12; B01D 2201/291;
(Continued)

(56) References Cited

U.S. PATENT DOCUMENTS 4,640,779 A 2/1987 Taki et al.
6,210,577 B1 4/2001 Garber
(Continued)

FOREIGN PATENT DOCUMENTS

DE    1 407 937    1/1972
DE    101 38 899    2/2003
(Continued)

OTHER PUBLICATIONS

International Search Report (ISR) dated Sep. 19, 2018 in International (PCT) Application No. PCT/EP2018/056907.

*Primary Examiner* — Madeline Gonzalez
(74) *Attorney, Agent, or Firm* — Wenderoth, Lind & Ponack, L.L.P.

(57) ABSTRACT

A device for treating fluid, in particular a filter device, has first and second tubular elements (12), (14) forming an element assembly (10). One element (14) is accommodated in the other element (12) forming a flow chamber (33) between the two elements (12, 14), with a first element (12) arranged in the direction of the inflow side (29) of a fluid to be treated and a second element (14) arranged in the direction of the outflow side (31) of the treated fluid in the element assembly (10). During the fluid treatment, the flow is routed through both elements (12, 14) in succession from the direction of the inflow side (29) towards the outflow side (31). In a joint viewing direction (P), the first element (12) facing the inflow side (29) at least partially has a uniform or
(Continued)

non-uniform contour and the second element (14) facing the outflow side (31) at least partially has a non-uniform or uniform contour.

13 Claims, 4 Drawing Sheets

(52) U.S. Cl.
CPC .... *B01D 2201/12* (2013.01); *B01D 2201/291* (2013.01); *B01D 2201/4046* (2013.01)

(58) Field of Classification Search
CPC ...... B01D 2201/4046; B01D 2201/122; B01D 2201/125; B01D 2201/298; B01D 2201/4038; B01D 2201/347; B01D 46/0021; B01D 46/0024; B01D 46/003; B01D 46/0031; B01D 46/2411; B01D 46/522; B01D 29/232; B01D 29/333; B01D 29/353; B01D 29/54; B01D 2201/342; B01D 29/50; B01D 29/56; B01D 29/016; B01D 29/031; B01D 29/038
USPC ............ 210/232, 314, 315, 337, 338, 493.1, 210/493.2, 493.5, 487, DIG. 5
See application file for complete search history.

(56) References Cited

U.S. PATENT DOCUMENTS

| | | |
|---|---|---|
| 2003/0029786 A1 | 2/2003 | Schmidt et al. |
| 2008/0302717 A1 | 12/2008 | Terry et al. |
| 2009/0020472 A1* | 1/2009 | Lucas ................ B01D 46/2411 |
| | | 210/458 |
| 2010/0243554 A1 | 9/2010 | Herrin et al. |
| 2011/0168647 A1 | 7/2011 | Wieczorek et al. |
| 2013/0256241 A1 | 10/2013 | Carmody |
| 2014/0008286 A1* | 1/2014 | Jiang ...................... F02M 37/34 |
| | | 210/338 |
| 2014/0124430 A1* | 5/2014 | Herges .................. B01D 29/15 |
| | | 210/323.2 |
| 2015/0251111 A1 | 9/2015 | Savstrom et al. |
| 2015/0343341 A1 | 12/2015 | Carrion |

FOREIGN PATENT DOCUMENTS

| | | |
|---|---|---|
| DE | 103 52 703 | 6/2005 |
| DE | 10 2010 003 961 | 7/2011 |
| DE | 10 2013 112 132 | 5/2015 |
| WO | 2011/126136 | 10/2011 |
| WO | 2014/059014 | 4/2014 |
| WO | 2017/207095 | 12/2017 |

* cited by examiner

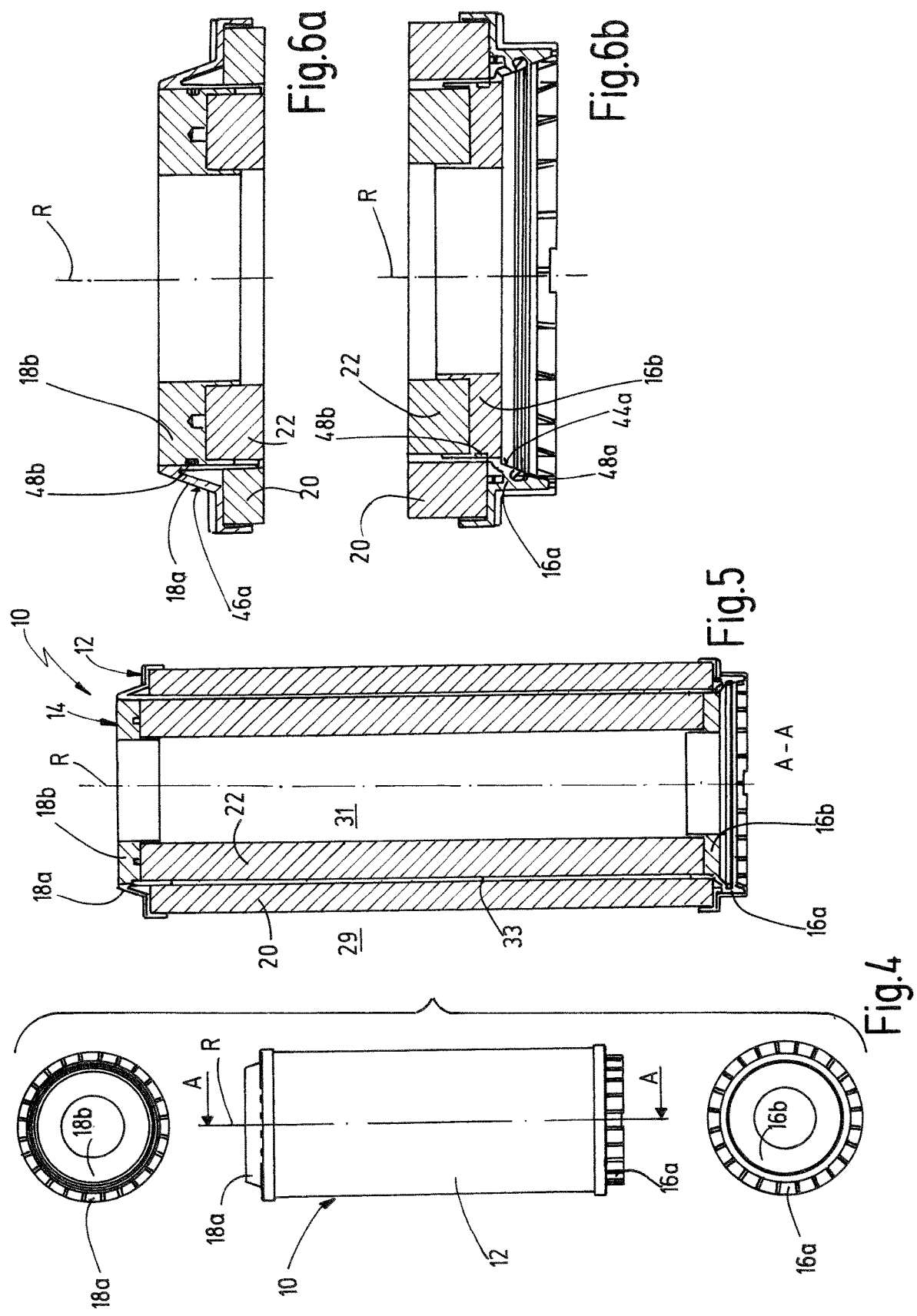

DEVICE FOR TREATING FLUID

FIELD OF THE INVENTION

The invention relates to a device for treating fluid, in particular a filter device, having first and second tubular elements forming an element assembly with each other. One tubular element is accommodated in the other tubular element forming a flow chamber between the two tubular elements, such that the first tubular element is arranged in the direction of the inflow side of a fluid to be treated and such that the second tubular element is arranged in the direction of the outflow side of the treated fluid in the element assembly. During the fluid treatment, the flow is routed through both elements in succession from the direction of the inflow side towards the outflow side.

BACKGROUND OF THE INVENTION

Such a device for treating fluid is known, for example, from DE 10 2010 003 961 A1, which discloses a filter device for fluids. The known filter device has a filter housing, in which at least one, preferably two, filter element(s) defining a longitudinal axis, can be received in the form of a filter cartridge. The cartridge has an enclosure for the end cap forming the relevant end rim of the filter material at at least one end, which end cap can be attached to the element holder interacting with the bottom part of the filter housing for securing the position of the filter element in its functional position. The element holder forms a fluid path for fluid discharged from the filter cavity of the filter element and contains a valve arrangement blocking the fluid path. Furthermore, a control device is provided on the end cap of the filter element to be attached to the element holder, which unlocks the valve arrangement in the functional position.

DE 103 52 703 B4 discloses a filter device having a filter housing and having a filter cartridge, comprising a filter material, which cartridge can be replaced and accommodated in the filter housing. The filter cartridge is subdivided into segments, which between them delimit a fluid space from where the fluid to be filtered flows in opposite directions through segments having the filter material. A cover part of the filter housing has a plurality of fluid passages through which fluid to be filtered enters the device via a recess in the cover part. The fluid space or chamber widens conically in the longitudinal direction thereof from a bottom part of the filter housing to the cover part. A plurality of web-shaped extensions of the bottom termination part jointly delimit fluid passages.

Depending on the intended use, for example for treating drinking water or process water, the known filter devices reach their limits. In addition to increasing the efficiency of treating fluid, it is desirable to conduct treatment steps based on the requirements, such as the separation of solids, liquids, or a combination of solids and liquids.

SUMMARY OF THE INVENTION

The invention addresses the problem of improving and expanding the performance and possible uses of a device for treating fluid, wherein in particular different treatment steps based on the requirements should be feasible.

The problem is solved by a device for treating fluid, and by a fluid treatment device.

A device according to the invention for treating fluid is characterized in that, in relation to a joint viewing direction, the first element facing the inflow side at least partially has a uniform or non-uniform contour and the second element facing the outflow side at least partially has a non-uniform or uniform contour. Due to the complementing or mating design of the two elements having uniform contours, non-uniform contours or a combination of uniform and non-uniform contours, a highly specialized, individual design of the device for treating fluids tailored to the demands is achieved. The selection of the respective contour is used to determine the treatment steps that can be performed for the respective elements and the desired properties, such as a specific flow behavior, and the performance of the device having the flow-through elements. As a result of the flow chamber formed between the two cascaded elements, the fluid flowing into the chamber is routed across a large surface area and largely evenly onto the inflow surface of the second element. In this way, a good flow of the fluid through the device and a high efficiency of the treatment steps performed using the device are ensured.

The joint view direction can be from the outside towards the element assembly, but also from the inside out. In a filtration direction from the outside to the inside, there is a separation "solid-liquid". In a filtration direction from the inside to the outside a "liquid-liquid" or a "liquid-gaseous" coalescence results. For the filtration direction and the joint view direction from the outside towards the inside, the contour of the first element, which faces the inflow side, is uniform and the contour of the second element, which faces the outflow side, is non-uniform. For the filtration direction and the joint viewing direction from the inside towards the outside, therefore, the contour of the first element (formerly the second element), which faces the inflow side, is non-uniform, and the contour of the second element (formerly the first element), which then faces the outflow side, is uniform. In any case, regardless of the respective view or direction of flow of the element assembly, one element can always have a uniform contour and the other element can have a non-uniform contour.

A preferred embodiment of the device according to the invention is characterized in that in the joint viewing direction in a predeterminable sector in the uniform contour, an element geometry of the one element is continuously repeated in a uniform shape, and the element geometry of the non-uniform contour of the other element is discontinuous. The uniformly repeated element geometry for a uniform characteristic is preferably formed by a corresponding folding of a single- or multilayer material, in particular a filter material. In this case, the uniform contour is preferably predetermined by identical element folds, in particular filter folds, of identical height and the non-uniform contour by element folds, in particular filter folds, having at least different fold heights.

For the purposes of the invention, predeterminable sector denotes a predeterminable angle section of the tubular, typically coaxially arranged, elements. The radially outer, first or second, element has a larger circumference and consequently a larger arc section in the predetermined sector. Depending on the direction of flow of the device, from the inside towards the outside or from the outside towards the inside, the contours and the inflow and outflow surfaces defined thereby are designed based on the requirements. A contour formed, for example, by element folds is advantageously oriented in a vertical direction extending in parallel to the axial alignment of the element assembly and specifies corresponding inflow or outflow channels. However, it is also conceivable to design inlet or outlet channels in a direction deviating from the vertical direction and, alternatively or additionally, in an arcuate course at the respective elements.

In a preferred embodiment of the device according to the invention, the continuously formed element geometry within the sector is formed by parts of a hollow or winding cylinder of filtering material and/or coalescing material or by a number of element folds of a filter material and/or coalescer material having a wave-shaped course of the same frequency and equal amplitude. Due to the individual requirements of the elements of a filtering material and/or a coalescing material and an assigned shape design, optimum properties of the device for treating fluid are adjusted.

If a deposit of particulate solids, such as sand, rust, abrasion, paraffins, asphaltenes or the like shall be performed, both elements are formed from a filtering material. For a separation of liquids, such as aerosols, oil mist, condensates or the like, both elements are formed from a coalescing material. For a combination of the separation of solids and liquids, one element is formed of a filtering material and another element of a coalescing material. In this case, the first element assigned to the inflow side is preferably designed for particle filtration and the second element assigned to the outflow side is preferably designed for coalescence filtration. Depending on the intended use, the filter media may be selected suitable for surface filtration or depth filtration. In the case of pure solids separation, the first element typically reached first by the flow has a coarser filter fineness than the second element subsequently reached by the flow.

In a further preferred embodiment of the device according to the invention, the discontinuously formed element geometry within the sector is formed by a number of element folds of a different or the same filter material and/or coalescer material, which have a waveform having the identical frequency and different amplitudes. Depending on the flow characteristics and filter or coalescer properties of the device according to the invention, the number, the frequency and the arrangement of the element folds of the two elements are selected in the predeterminable sector. Typically, the element folds of the two elements are arranged relative to each other such that in the respective sector at least one element fold of one element with another element fold of the other element is aligned with the axis of symmetry of the tubular elements. Based on an arrangement of two elements formed from filter folds, a filter performance adapted to the respective filtration tasks and further a high reliability, even for contamination surges, are ensured by a cascade effect when the flow is routed through the device.

In a further preferred embodiment of the invention, the respective continuous and discontinuous element geometries of the predeterminable sectors in succession each form a hollow cylinder for the one element and the other element. Due to the uniform configuration of the device according to the invention, a uniform process performance, in particular a uniform filter and/or coalescer performance of the device is achieved across its entire lateral surface.

In a further preferred embodiment of the device according to the invention, the discontinuously extending element folds are held in succession spaced at a distance to form a channel guide and then are blocked. In the assignable sector, the continuous element folds cover the channel guide at least partially at predetermined points of their deflection having a radial offset. Due to the arrangement and configuration of the element folds at the respective elements, inlet and outlet channels for the fluid to be treated are designed based on the requirements. Due to the at least partial overlap of the channels at the two elements arranged adjacent in or to each other, a largely steady flow and a corresponding deceleration or acceleration of the flowing fluid upon contact with the respective inflow or outflow surfaces is achieved.

It is also advantageous if the ratio of the element numbers in at least one adjacent sector from uniform to non-uniform element geometry is between 1:2 and 1:4. Typically, the element having a larger number of elements in the predetermined sector is arranged radially on the outside and, depending on the direction of flow through the device, the first or second element. The ratio of the number of elements in the predetermined value range can be used to adjust a particularly well-graded filtration performance having a high storage volume for contamination and a good gradation between coarse filtration in the first element and fine filtration in the second element. Depending on their design, the element folds have an edge-like or wave-like transition on the inflow and outflow sides, respectively.

In a preferred embodiment of the device according to the invention, depending on the indirection of flow of the element assembly, at least the element located on the outflow side is provided with a support structure, such as preferably a perforated support tube on the outer and/or inner circumference. Depending on the configuration of the elements, a preferably grid-shaped support structure is provided radially on the inside or the outside, increasing the dimensional stability of the element assembly during the treatment of fluid in operation.

In a further preferred embodiment of the device according to the invention, a drainage layer is exclusively or additionally arranged between the two elements in the element assembly, which drainage layer may also be formed in the manner of a cavity between the elements. The drainage layer fills the flow chamber at least partially, preferably completely, and causes a desired flow behavior of the fluid when it passes from the first element to the second element. The flow chamber has the shape of a radial annular space at a preferably constant radial extent. However, embodiments having variable dimensions, for instance, due to extensions or constrictions in the axial or radial direction, are conceivable.

In a preferred embodiment of the invention, at least one of the elements designed as separation or coalescer filter is used for the phase separation of liquid media, such as suspensions, in particular for the separation of water and/or air from operating media, such as hydraulic oil or fuel, and the other element is used for cleaning particulate contamination from the media stream. Such a device is particularly well suited for use in a plant, in which sea water or surface water from a body of water is treated to be used as process water or drinking water. The different treatment steps are assigned cluster-shaped to the one element for the phase separation of liquid media and to the other element for cleaning the media stream. Particularly preferably, the two elements are detachably assembled as the element assembly and are independently interchangeable at the latter. This arrangement results in the advantage that depending on contamination and loading during filtration and coalescence operation, the elements can be individually replaced as required and the device can be operated in a cost-saving and material-saving manner.

In a further preferred embodiment of the invention, in the element assembly the free end sides of one, preferably the outer element, is closed by one element cap each, which receives the element material of the outer element and which has a web-shaped guide ring on its side facing the inner element. Against the guide ring, the assignable end cap of the other, preferably inner, element rests. In this way, the interacting end caps ensure a secure, releasable bond of the two elements. Typically, the elements are manufactured separately from the end caps and assembled as required to form an element assembly. To this end, the formation of a modular system for storage, distribution and provision of the elements as equipment of industrial plants, especially for drinking and process water treatment, is conceivable.

In a preferred embodiment of the device according to the invention, the mutually assignable, adjacent pairs of end caps of the one and the other element at least partially, in particular in the area of the receiving opening of the respective web-shaped guide ring, end flush with each other. In this way, a termination surface in a plane oriented preferably perpendicular to the axis of symmetry of the element assembly is formed at the individual end of the element assembly. This facilitates the transport, the storage and the stackability of the device.

Advantageously, the opposing end caps of at least one, preferably of the outer element, are provided with correspondingly formed guide bevels, which permit the engagement of the one end cap of the one element assembly with the adjacent end cap of the other element assembly in the stacked assembly of at least two superimposed elements of one element assembly each. In a series arrangement of a plurality of element assemblies, they are arranged sequentially along their axes of symmetry and set against each other at the end caps. The guide bevels result in a mutual engagement and thus a positional securing of the two adjacently arranged element assemblies. Typically, the guide bevels are formed in the radial direction extending at the respective end caps.

In a further preferred embodiment of the device according to the invention, the guide bevels of the two elements of each element assembly adjacent in the stacked assembly are sealed from each other by a sealing device, in particular in the form of an O-ring. In addition to an additional positional securing of the two adjacent element assemblies, this structure offers the particular advantage of a clean fluid guide within the element assemblies adjoining each other, which as a whole form a device for the treatment of fluids and through which fluid can flow. The element assemblies are typically held in a filter housing, at which at least one fluid inlet and at least one fluid outlet are formed.

The invention further relates to a fluid treatment device having a having a housing, preferably mounted on posts, having an inlet and an outlet for untreated and treated fluid. The housing has at least two separate cup-shaped housing parts, of which one housing part has an element holder for receiving at least one element assembly, and two adjacent housing parts can be detachably secured to each other by means of a clamping device. Because the housing consists of two housing parts, a receiving chamber for the elements for treating the fluid and a flow chamber for the fluid to be treated is given. The detachable attachment of the two housing parts permits the replacement of elements of the element assembly and maintenance and repair work in a few simple steps and in a simple manner.

The above-mentioned features and the further cited features according to the invention can be implemented individually or in any combination at a device for treating fluids and at a fluid treatment device. Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIG. 2 is a plan view in cross section through a partial section of the element assembly of FIG. 1a;

FIG. 4 is a side view of an element assembly in accordance with the exemplary embodiment of the invention as a whole, with separate end caps in plan views of the end caps;

FIG. 5 is a side view in section through the element assembly of FIG. 4;

FIGS. 6a and 6b are enlarged, partial side views of the end cap areas of the element assembly of FIG. 5.

DETAILED DESCRIPTION OF THE INVENTION

Figure 1C:
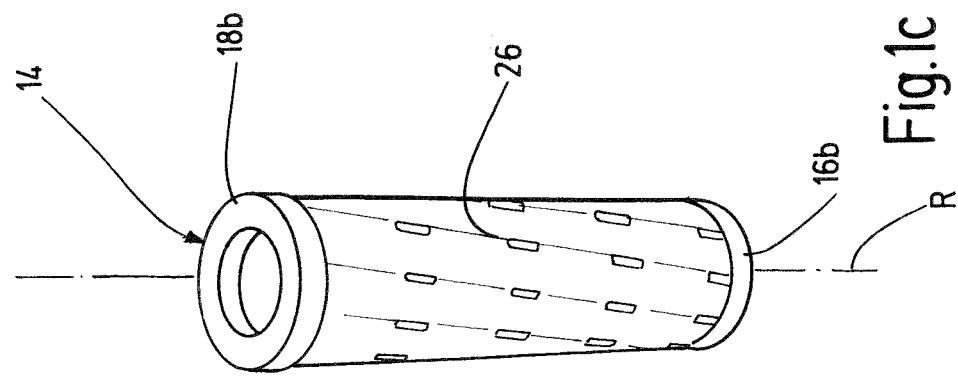
FIG. 1c is a perspective view of the second element of FIG. 1a, to be radially arranged at the inside.
Figure 1B:
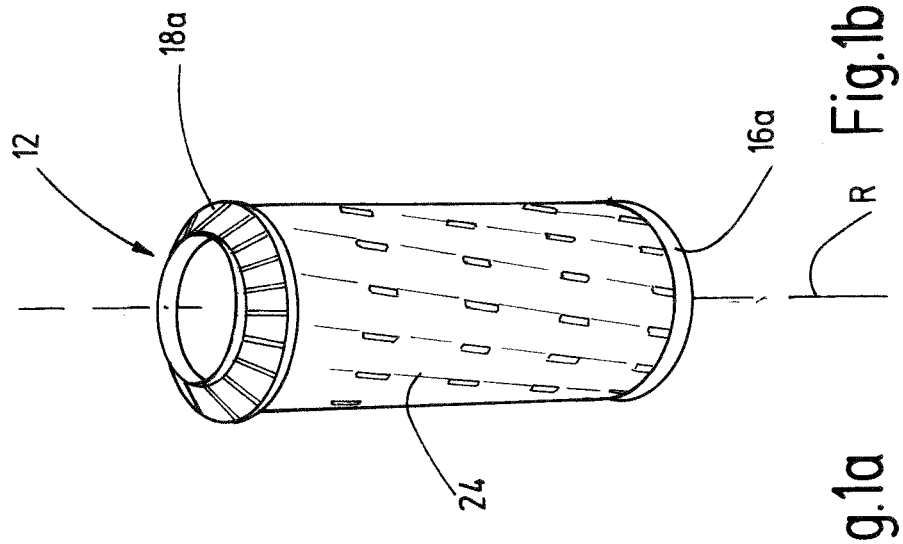
FIG. 1b is a perspective view of the first element of FIG. 1a, to be radially arranged at the outside.
Figure 1A:
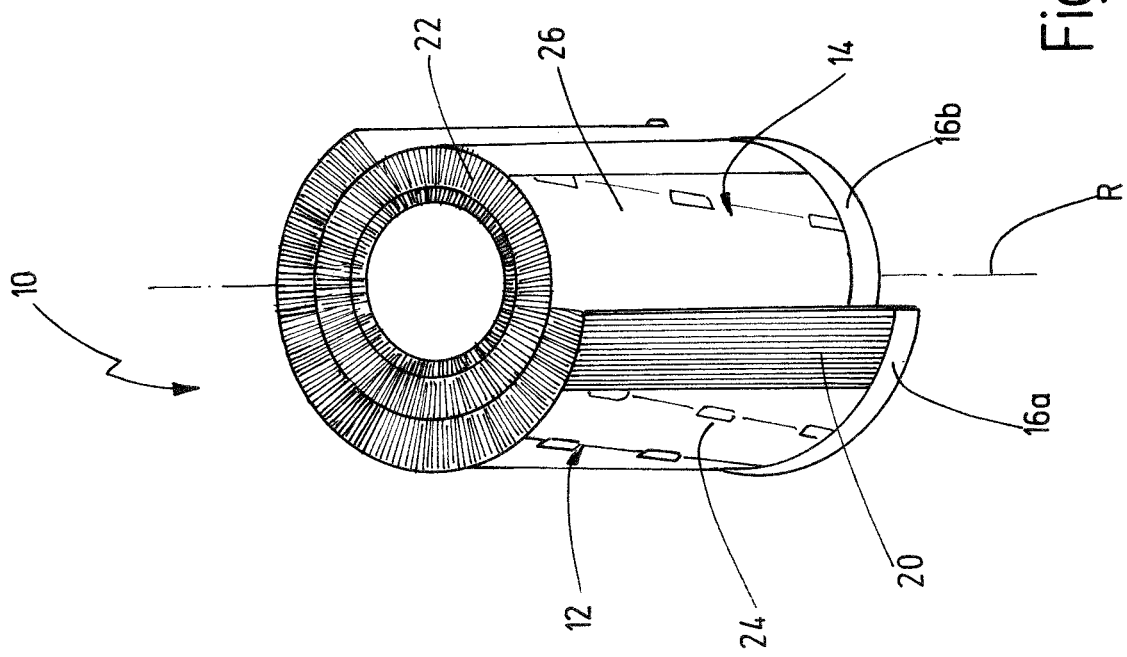
FIG. 1a is a perspective view, partially in section, of an element assembly in accordance with an exemplary embodiment of the invention.

FIG. 1a shows a perspective view of an element assembly 10 of a first element 12 and a second element 14, which are each formed in a hollow cylinder and rotationally symmetrical to an axis of symmetry R. The illustration of the assembled element assembly 10 shown in FIG. 1a shows that both elements 12, 14 are arranged coaxially adjacent to each other and enclose a cylindrical cavity. In this case, the first element 12 shown separately in the illustration of FIG. 1b is arranged radially on the outside. The second element 14 shown separately in the illustration of FIG. 1c is arranged radially on the inside.

Each element 12, 14 has a lower end cap 16a, 16b and an upper end cap 18a, 18b. The end caps 16a, 16b, 18a, 18b are each rotationally symmetrical to the axis of symmetry R. The upper end cap 18a formed on the first member 12 has a sloping surface, like a truncated cone or a frustoconical surface, and a collar-shaped, cylindrical termination at the upper end. The upper end cap 18b formed on the second element 14 has a flat or planar surface oriented perpendicular to the axis of symmetry R on its top. The dimensions of the two elements 12, 14 are selected such that the second element 14 together with end caps 16b, 18b can be inserted into the first element 12 via at least one of the openings provided by the end caps 16a, 18a on the first element 12.

The at least partially sectional illustration of the composite element assembly 10 shown in FIG. 1a shows that the element materials 20, 22 of both elements 12, 14 are pleated in a plurality of element folds 28, 30a, 30b (cf. FIG. 2) arranged adjacent to each other. To stabilize the position of the respective folded assemblies when fluid to be treated flows through the element assembly 10, in the exemplary embodiment shown from the outside towards the inside, a support tube 24, 26 is arranged radially on the outside of each element 12, 14, as clearly visible in FIGS. 1b and 1c. The support tubes 24, 26 are each formed perforated from a plastic material and have labeling boxes for a product or manufacturer's name in the exemplary embodiment shown.

Figure 2:
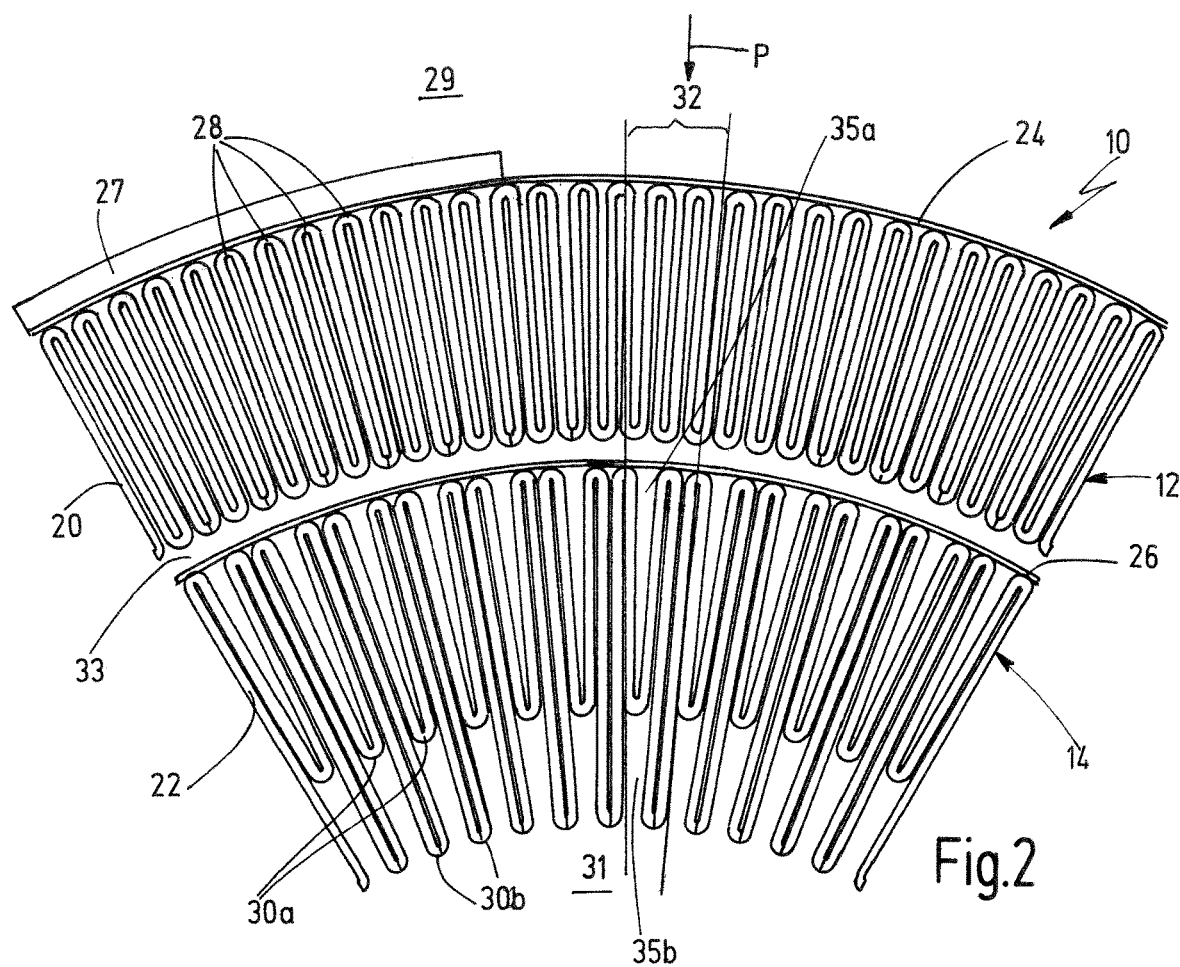

The sectional view of FIG. 2 of a partial section of the element assembly 10 of FIG. 1a, shows that the outer first element 12 in the element assembly 10 has a uniform contour and the inner second element 14 in the element assembly has a non-uniform contour. The first element material 20 of the first element 12 comprises folds 28 of the first element arranged side by side in close succession, which have the same fold height in the radial direction and merge into one another at curved deflections. The folds 30a, 30b of the second element 14 forming the material of the second element 22 of the second element 14 differ from the folds of the first element 28 in that they have two different fold heights, a small fold height of the folds 30a of the second element 14, and a large fold height of the folds 30b of the second element 14.

A joint direction of view on the element assembly 10 is indicated by the arrow P in the sector 32. In relation to the viewing direction P, the first element 12 has a uniform contour, formed of folds 28 of the first element 20 running continuously at the same frequency and the same amplitude, and the second element 14 has a non-uniform contour, formed of folds 30a, 30b of the second element 22 running discontinuously having the same frequency and different amplitudes. Depending on the desired properties of the element assembly 10, a hollow or winding cylinder of filtering and/or coalescing material is preferably used as material of the first element 20. In addition, the material of the second element 22 particularly preferably has folds 30a, 30b of the second element having a wave path of a different frequency.

In the exemplary embodiment shown, the ratio between the fold heights is selected such that the fold height of the shorter element folds 30a is about ⅔ of the fold height of the longer element folds 30b. The folds 30a, 30b of the second element also merge into one another at arc-shaped deflections. The shorter and longer folds 30a, 30b of the second element are arranged alternately successively in the material of the second element 22. Here, any, preferably periodically repeating sequences of folds of the second element 30a, 30b of different fold height are conceivable.

In the case of the element assembly 10, where the flow is routed from the outside to the inside, an inflow side 29 is arranged radially on the outside and an outflow side 31 is arranged radially on the inside. The support tubes 24, 26 are each directed radially outward to the inflow side 29, arranged on the respective elements 12, 14, and are in abutment with the deflections of the respective element folds 28, 30a, 30b there. Alternatively or additionally, on the respective elements 12, 14 a further support tube, not shown in FIG. 2, may be arranged radially inwards, directed towards the outflow side 31. The contamination 27 cleaned by the element assembly 10 from a fluid flowing from the inflow side 29 to the outflow side 31 is indicated in the illustration of FIG. 2 in at least partial contact with the first support tube 24. Between first element 12 and second element 14, a narrow, annular flow chamber 33 is formed, which is kept free of other components in the exemplary embodiment shown. However, it is conceivable to arrange a drainage layer there at least partially for the flow line of the fluid during the transition from the first element 12 to the second element 14.

The fold arrangement in the sector 32, which corresponds to a predetermined angle section of the hollow-cylindrical element assembly 10, illustrates that the first element 12 has a greater number of folds than the second element 14. 2.5 folds 28 of the first element 12 and two folds 30a, 30b of the second element 14 are arranged in the sector 32. Due to the different fold heights of the folds 30a, 30b of the second element a channel guide 35a, 35b is formed both on the inflow side and on the outflow side of the second embodiment. The channel guide 35a facing the inflow side 29 is formed by an expansion of the material of the second element 22 due to the folding. The channel guide 35b facing the outflow side 31 is formed by different positions of the deflections between adjacent folds 30a, 30b of the second element having different fold heights. In the exemplary embodiment shown, the longer folds 30b of the second element 14 protrude beyond the shorter folds 30a of the second element in the direction of the outflow side 31. It is conceivable to arrange further element folds having identical or differing fold heights in the material of the second element 22, in particular wherein these further element folds project toward the inflow side 29 beyond the other folds of the second elements, and thus, define channel guides.

The element materials 20, 22 are each formed from one or more layers, depending on the requirement profile for the element assembly 10 from a coalescing or filtering material. Typically, stacked filter layers of different porosity, called "multilayer" in technical language are used. The contamination intake capacity is optimally adjusted based on a suitable choice of material and a suitable element geometry. The service life of a device for the treatment of fluid having at least one element assembly 10 is formed as long as possible. Large-pored material layers are used to retain large particles of contamination. The separation of smaller particles is performed in the direction of flow in material layers, which determine the filter fineness. An accompanying depth filter effect ensures that no migration of contamination particles or gels from the contamination side to the clean side occurs, even at high differential pressures.

If one or both filter elements in the element assembly are used as coalescence element(s) or have at least one media layer having coalescing characteristics, a nonwoven, which has a directional pore and size gradient from fine to coarse, can preferably be used for this purpose. Within the fluid, finely distributed air bubbles having a low buoyancy tendency are transported starting from a fine pore gradient of the nonwoven in the direction of a coarse pore gradient, i.e. for coalescence of the air bubbles, large air bubbles having a high buoyancy tendency are generated within the media layer, which then leave the media layer towards the environment. Due to the mentioned grading from fine to coarse, the media layer has, viewed in cross-section, a kind of funnel-shaped V-structure. The outwardly flared funnel is used to discharge buoyant large bubbles after the previous coalescence stage. Filter elements having coalescence characteristics provide for finely dispersed air bubbles initially present in the fluid stream to merge to increasingly larger units. The volume of the bubbles increases, with the result that the now larger air bubbles have greater buoyancy due to their surface tension, i.e. have a faster ascent rate and hence the air is dissipated more quickly from the fluid. The fluid can then be degassed faster and better than otherwise.

The media layer having the coalescence characteristics is preferably arranged on the outflow side of the filter element for all direction of flows of the fluid. In this way, the air bubbles enlarged by the coalescing layer can be prevented from being undesirably "shredded" again by a finer filter material downstream in the direction of flow.

The pleated element structure, in particular for parallel folding, makes for an extremely high folding stability at a large element circumference. An element 12, 14 designed in this way can withstand high flow rates. The robust and high-quality layer structure, in addition to a high contamination holding capacity, also warrants low pressure losses during the passage of fluid. In a system for generating drinking water from seawater or surface water, the element assembly 10 can be used both in a coarse filter, a fine filter and in a superfine filter. In particular, sediments, zooplankton, phytoplankton and bacteria and other particles and impurities are separated from the water to be treated. Water treated, in particular purified and desalted, in such a process is used for example as drinking water or boiler feedwater.

Typically, the layer sequence of a multilayer element material 20, 22 comprises a drainage layer, a protective fleece, a pre-filter, a main filter, another protective fleece and a further drainage layer. The filter finenesses are particularly preferably selected in the value range from 1 μm to 90 μm. Conveniently, a plastic such as polyester or polypropylene is selected as the filter material. The areas of application of industrial plants equipped with one or more element assemblies 10 are manifold and extend to all sources of water, in particular salt water, groundwater, surface water from a lake or river, brackish water, seawater, industrial water and effluent from sewage treatment plants.

Figure 3:
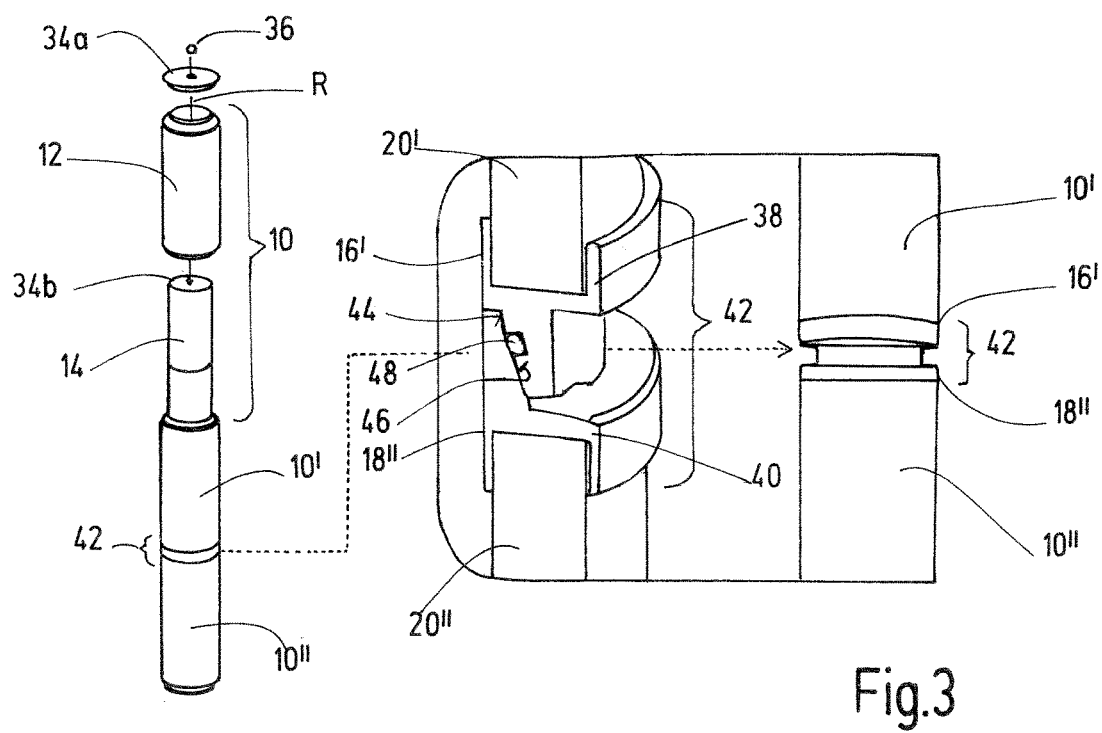
FIG. 3 includes views of a stacked assembly of several element assemblies in accordance with the exemplary embodiment of the invention, in a partially exploded perspective view, a partially exploded perspective view of a section through a connection area between two adjacent elements and a side view thereof.

FIG. 3 shows in plan view a stacked assembly of three element assemblies 10, 10', 10" successively arranged along the axis of symmetry R. The element assembly 10 shown above is shown in an exploded view. The two elements 12, 14 each have a cover 34a, 34b on their tops, which are attached by a fastener 36 and in that way form an upper termination of the stacked assembly. A connecting part 42 between a lower end cap 16' of the central element assembly 10' and the upper end cap 18" of the lower element assembly 10" is shown as an enlarged detail to the right of the stacked assembly shown in overall view.

A section through the connecting part 42 illustrates that a guide ring 38, 40 having a U-shaped cross section is formed on each of the two end caps 16', 18", in which a lower or upper end area of the respective element materials 20', 20" is accommodated. Further, an end cap of an inner element, not shown in the illustration of FIG. 3, can come to rest on the respective guide rings 38, 40 in the radial direction. Further one guide bevel 44, 46 each is formed at the respective end caps 16', 18". Both guide bevels 44, 46 are formed corresponding to each other and are flush in contact with each other in the assembled state of the element assemblies 10', 10".

The shape design is chosen such that the guide bevel 44 formed on the lower end cap 16' is formed radially inwards and follows the course of a conical enlargement from top to bottom. The further guide bevel 46 formed on the upper end cap 18" is formed like a counter part in a radially outward direction and follows the course of a conical taper from bottom to top. At the upper guide bevel 44 in the illustration of FIG. 3, further an annular groove is formed, in which a sealing device 48 in the form of an O-ring is arranged. In this way, a seal is achieved on the abutting guide bevels 44, 46.

FIG. 4 shows a side view of the element assembly 10 with the first element 12 arranged on the outside and the two end caps 16a, 18a. In separately shown plan views from above and from below onto the element assembly 10, not only the end caps 16a, 18a assigned to the first element 12 are shown, but also the end caps 16b, 18b formed on the inner second element (14, not visible in FIG. 4). The lower end caps 16a, 16b and the upper end caps 18a, 18b are each arranged coaxially to each other and formed rotationally symmetrical to the axis of symmetry R.

FIG. 5 shows a longitudinal section through the element assembly 10 along a vertical plane A-A enclosing the axis of symmetry R. The element materials 20, 22, which are arranged between the end caps 16a, 16b, 18a, 18b and which are received on the edges thereof, are arranged adjacent to one another and delimit the comparatively narrow flow chamber 33 between one another. The radially outer first element 12 has a shorter extent in the radial direction than the radially inner second element 44. This is also clearly visible in FIG. 2. In the exemplary embodiment shown, the inflow side 29 is located radially on the outside, and the outflow side 31 is located radially inside in a cylindrical cavity encompassed by the element assembly 10. The flow through the element assembly 10 can also be designed to flow in the opposite direction, i.e. from the inside to the outside.

The enlarged partial view of the end cap areas in FIGS. 6a and 6b shows that the element materials 20, 22 are each received on the top and bottom of the assigned end caps 16a, 16b, 18a, 18b and are held in position due to this arrangement. The sealing device 48a at the guide bevel 44a of the lower end cap 16a is used to achieve a corresponding sealing effect in contact with a corresponding guide bevel, comparable to the further guide bevel 46a of the upper end cap 18a. The radial abutment of the outer end caps 16a, 18a and the inner end cap 16b, 18b is sealed in each case by way of further sealing devices 48b. The guide bevels 44, 44a, 46, 46a at the conically shaped end caps 16a, 16', 18a, 18" are used to achieve an exact guidance of the respective elements 12 on the assigned support tube and the assigned sealing means or seals 48, 48a are effectively prevented from breaking away. Furthermore, during the mounting of the stacked assembly shown in FIG. 3, jamming of the element assemblies 10-10" is prevented, thus ensuring easy handling during assembly, maintenance, repair and disassembly.

Figure 7:
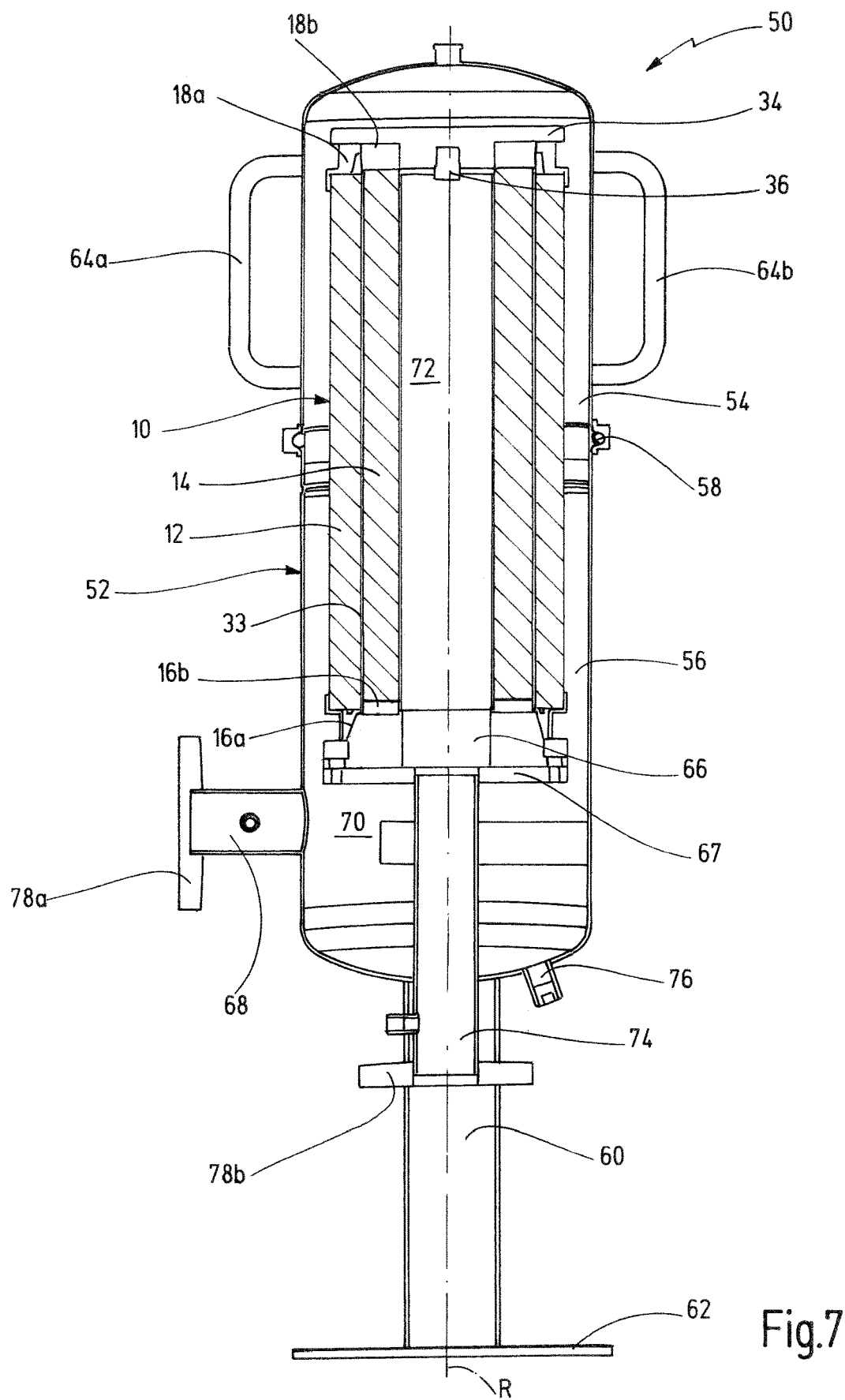
FIG. 7 is a side view in section through a fluid treatment device according to an exemplary embodiment of the invention in a ready-to-use setup.

FIG. 7 shows a cross-section of a fluid treatment device 50 having a filter-bowl-shaped housing 52. The housing 52 is composed of an upper housing part 54, which also includes a cover part, and a lower housing part 56, which also includes a bottom part. Both housing parts 54, 56 are detachably secured to each other by a clamping device 58 running along the circumference. The housing 52 as a whole is placed on a support 60 coaxially arranged to the axis of symmetry R. At the lower end, the support 60 is mounted on a bottom plate 62, which warrants a stable position of the entire fluid treatment device 50. For easy handling, in particular during repair and maintenance work, two handles 64a, 64b are formed on the upper housing part 54 for a convenient lifting of the upper housing part 54 from the lower housing part 56. The two handles 64a, 64b are designed similar and are arranged radially outward, opposite to the outside of the upper housing part 54.

In the interior of the housing 52, which is formed rotationally symmetrical to the axis of symmetry R, an element holder 66 is formed in the lower housing part 56, which is formed like a counterpart to the lower end caps 16a, 16b of the element assembly 10 shown in FIGS. 4 and 5. The element holder 66 is placed on a support plate 67 and forms the support for the element assembly 10, which extends along the axial extent of the housing 52 nearly up to the cover part. A cover 34, similar to that of the illustration of FIG. 3, is arranged at the top of the element assembly 10 facing the cover part, and closes off an element interior 72 encompassed by the element assembly 10 in this respect.

In the illustration of FIG. 7, bottom left, an inlet 68 for fluid to be treated is provided on the stationary lower housing part 56. Fluid flows into a housing interior 70 of the housing 52 via the inlet 68 and reaches the element interior 72 of the element assembly 10 before passing through the element assembly 10. While the flow passes through the first element 12, the flow chamber 33 and the second element 14 of the element assembly 10, the process steps required for the treatment, in particular for cleaning, of the fluid are performed. From the clean side representing element interior 72, which is defined by the element assembly 10, the fluid reaches a drain 74 and exits the housing 52.

The outlet 74 for the treated, in particular cleaned, fluid adjoins the element interior 72 via a corresponding opening in the element holder 66 and the carrier plate 67 at the bottom. In addition, a manual fluid outlet 76 is arranged at the bottom part of the lower housing part 56. In the ready-to-use illustration of the fluid treatment device 50 shown in FIG. 7, the inlet 68 and the outlet 74 are each blocked by a shut-off device 78*a*, 78*b*. The shut-off devices 78*a*, 78*b* have to be opened for the operation of the fluid treatment device 50. The components of the fluid treatment device 50, in particular the housing 52 having an upper 54 and a lower housing part 56 and the support 60 and the bottom plate 62 are typically made of a metal material. A dimensionally stable material, in particular a metal material has to be chosen for the support plate 67 and the element holder 66. A plurality of element assemblies 10, 10', 10" (cf. FIG. 3) can be arranged side by side on the carrier plate 67 having corresponding element receptacles 66 or as a stacked assembly along the axis of symmetry R on a joint element holder 66 in the housing 52.

While one embodiment has been chosen to illustrate the invention, it will be understood by those skilled in the art that various changes and modifications can be made therein without departing from the scope of the invention as defined in the claims.

The invention claimed is:

1. A device for treating fluid, comprising:
a first element assembly having first and second tubular elements with the second tubular element being inside the first tubular element, the first tubular element being in a fluid flow direction of and facing an inflow side of the element assembly and the second tubular element being in the fluid flow direction of and facing an outflow side of the element assembly such that fluid flows in succession through the first and second tubular elements from the inflow side to the outflow side during fluid treatment;
an annular flow chamber between the first and second tubular elements, the annular flow chamber being free of other filter components;
a first material of the first tubular element having a continuously repeating shape only of uniform first element folds of an equal fold height in radial directions thereof; and
a second material of the second tubular element having a continuously repeating shape of non-uniform second element folds with shorter and longer folds heights in radial directions thereof arranged in an alternating succession forming a waveform of constant frequency and different amplitudes and spaced at distances forming channel guides blocked at deflection points of the second element folds, the defection points having radial offsets, the shorter fold heights being about two-thirds of the longer fold heights.

2. A device according to claim 1 wherein
the first material is of a filter material and the second material is of a coalescing material, the first and second materials each forming a hollow cylinder.

3. A device according to claim 1 wherein
each of the first and second materials form a hollow cylinder.

4. A device according to claim 1 wherein
a ratio of numbers of element folds in at least one sector of the element assembly from the first and second tubular elements is between 1:2 and 1:4.

5. A device according to claim 1 wherein
a perforated support tube surrounds the outflow side of the element assembly.

6. A device according to claim 1 wherein
the second tubular element comprises a separation or coalescer filter capable of phase separation of a media stream; and
the first tubular element is capable of cleaning particulate contamination from the media stream.

7. A device according to claim 1 wherein
each of the first and second tubular element has opposite first and second axial ends, the first and second axial ends of the first tubular element being closed by first end caps that receive the first material and that have web-shaped guide rings facing the second tubular element;
the second tubular element has second end caps on the first and second axial ends thereof, the second end caps resting against the guide rings.

8. A device according to claim 7 wherein
adjacent pairs of the first and second end caps end flush with one another.

9. A device according to claim 7 wherein
the first end caps have guide bevels engaging with mating guide bevels on end caps on a second element assembly forming a stacked assembly of the first and second element assemblies.

10. A device according to claim 9 wherein
the guide bevels of the first and second element assemblies have seals therebetween.

11. A device according to claim 10 wherein
the seals are O-rings.

12. A device according to claim 1 wherein
each adjacent pair of the second element folds of the longer heights are separated by only one of the second element folds of the shorter heights; and
each adjacent pair of the second element folds of the shorter heights are separated by only one of the second element folds of the longer heights.

13. A device according to claim 12 wherein
each of the second element folds of the shorter heights extend from an outer side of the second tubular element toward the outflow side.

* * * * *